United States Patent
Carmel et al.

(10) Patent No.: US 8,892,554 B2
(45) Date of Patent: Nov. 18, 2014

(54) AUTOMATIC WORD-CLOUD GENERATION

(75) Inventors: David Carmel, Haifa (IL); Ido Guy, Haifa (IL); Yosi Mass, Ramat Gan (IL); Haggai Roitman, Yokneam Elit (IL); Erel Uziel, Moshav Yodfat (IL)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 13/113,110

(22) Filed: May 23, 2011

(65) Prior Publication Data

US 2012/0303637 A1 Nov. 29, 2012

(51) Int. Cl.
*G06F 17/30* (2006.01)
*G06F 7/00* (2006.01)
*G06F 17/24* (2006.01)

(52) U.S. Cl.
CPC .... *G06F 17/30616* (2013.01); *G06F 17/30722* (2013.01); *G06F 17/241* (2013.01)
USPC ............. 707/736; 707/748; 707/749; 706/15; 706/18; 706/20

(58) Field of Classification Search
CPC ............ G06F 17/2818; G06F 17/2247; G06F 17/227; G06F 17/241; G06F 17/27; G06F 17/2715; G06F 17/30616; G06F 17/30675; G06F 17/30873
See application file for complete search history.

(56) References Cited

U.S. PATENT DOCUMENTS

| | | | |
|---|---|---|---|
| 7,685,198 B2 * | 3/2010 | Xu et al. ................ | 707/748 |
| 2007/0033004 A1 * | 2/2007 | Bangalore et al. ........ | 704/9 |
| 2007/0174247 A1 * | 7/2007 | Xu et al. ................ | 707/3 |
| 2008/0231644 A1 * | 9/2008 | Lempel et al. ........... | 345/689 |
| 2009/0254540 A1 | 10/2009 | Musgrove et al. | |
| 2010/0010982 A1 | 1/2010 | Broder et al. | |
| 2010/0049766 A1 | 2/2010 | Sweeney et al. | |
| 2010/0205541 A1 * | 8/2010 | Rapaport et al. ......... | 715/753 |
| 2010/0241507 A1 * | 9/2010 | Quinn et al. ............. | 705/14.42 |
| 2010/0280904 A1 * | 11/2010 | Ahuja .................... | 705/14.58 |
| 2011/0270678 A1 * | 11/2011 | Drummond et al. ...... | 705/14.52 |

FOREIGN PATENT DOCUMENTS

WO     2010042983     4/2010

OTHER PUBLICATIONS

Yang Song, Ziming Zhuang, Huajing Li, Qiankun Zhao, Jia Li, Wang-Chien Lee, C. Lee Giles, "Real-Time Automatic Tag Recommendation", 2008, ACM, pp. 1-8.*

Cédric Mesnage and Cédric Mesnage, "Piloted search and recommendation with Psocial tag cloud-based navigation", WOMRAD 2010 Workshop on Music Recommendation and Discovery, colocated with ACM RecSys 2010 (Barcelona, Spain).

"Folksonomy-based keyword extraction for tag-cloud generation", IP.com—Prior art DB, Oct. 2010.

* cited by examiner

*Primary Examiner* — Angelica Ruiz
(74) *Attorney, Agent, or Firm* — Daniel Kligler (57) ABSTRACT

Method, system, and computer program product for automatic generation of a word-cloud for a content item are provided. The method includes: extracting terms from a content item using statistical selection criteria; weighting a term by a probability that the term is used as a tag; and generating a visual representation of terms with enhanced representation of terms according to the weighting. Weighting a term by a probability that the term is used as a tag may include determining the relative frequency of the term in a folksonomy of tag terms for a domain.

21 Claims, 5 Drawing Sheets

AUTOMATIC WORD-CLOUD GENERATION

BACKGROUND

This invention relates to the field of word-clouds for visualizing data content. In particular, the invention relates to automatic word-cloud generation for sparsely tagged content.

The emergence of social media applications in recent years encourages people to be actively involved in content creation and classification, either through publishing personal blogs, providing direct feedback through comments, ratings, recommendations, sharing content such as photos and videos with the general public, and annotating content. Collaborative bookmarking systems such as Delicious (delicious.com, Delicious is a trade mark of Yahoo! Inc.), Dogear (Dogear is a trade mark of International Business Machines Corporation) for the enterprise, and many other content sharing sites (e.g., Flickr (www.flickr.com, Flickr is a trade mark of Yahoo! Inc.), Last.fm (www.last.fm, Last.fm is a trade mark of CBS Interactive), YouTube (www.youtube.com, YouTube is a trade mark of YouTube LLC)), encourage users to tag available content for their own usage as well as for the public. Other sites such as blogging services encourage their bloggers to tag their own content to improve the disclosure and findability of their posts.

A tag-cloud is a visual depiction of the terms of a content item, typically used to provide a visual summary or a semantic view of an item or a cluster of items that have something in common (e.g., the search results for a specific query). Tag-clouds have been popularized by social media sites such as Delicious, Flickr, and many others, to become a standard visualization tool for content representation on social media sites.

Tags in the cloud are normally listed alphabetically, and the importance of a tag is represented with font size or color. Thus, it is possible to easily find a tag alphabetically and by its importance. A tag in the cloud usually links to all items that are associated with it.

Tags annotated by users form a taxonomy of the tagged items, commonly termed folksonomy. The value of the folksonomy is derived from people who use their own vocabulary and add explicit meaning, which may derive from a personal inferred understanding of the item's value. Folksonomies have been found to be extremely useful for many information retrieval applications, including tag-cloud representation of social media items, query refinement, and search and browse enhancement.

Obviously, meaningful, high-quality tag-clouds can be generated in well-tagged domains where the resources are widely tagged. An item can be successfully represented by the tag-cloud that is based on its own tags, or on tags associated with similar items. On the contrary, existing tag-cloud generation techniques have difficulty in generating good representative tag-clouds for items in sparsely tagged domains.

When manual (user-provided) tags are not available, feature selection techniques can be used to extract meaningful terms from the item's content, or from other textual resources that are related to the item such as anchor-text or the item's meta-data. These extracted terms can be used as alternative tags to the manual tags. Extracted term based tag-clouds are referred to as word-clouds as they are formed of generated terms and not manual tags.

Extracted terms are usually inferior to manual tags since significant terms, from a statistical perspective, do not necessarily serve as good labels for the content from which they were extracted.

BRIEF SUMMARY

According to a first aspect of the present invention there is provided a method for automatic generation of a word-cloud for a content item, comprising: extracting terms from a content item using statistical selection criteria; weighting a term by a probability that the term is used as a tag; generating a visual representation of terms with enhanced representation of terms according to the weighting; wherein said steps are implemented in either: computer hardware configured to perform said steps, or computer software embodied in a non-transitory, tangible, computer-readable storage medium.

According to a second aspect of the present invention there is provided a system for automatic generation of a word-cloud for a content item, comprising: a processor; a term extractor for extracting terms from a content item using statistical selection criteria; a term weighting component for weighting a term by a probability that the term is used as a tag; a word-cloud generator for generating a visual representation of terms with enhanced representation of terms according to the weighting.

According to a third aspect of the present invention there is provided a computer program product for automatic generation of a word-cloud for a content item, the computer program product comprising: a computer readable storage medium having computer readable program code embodied therewith, the computer readable program code comprising: computer readable program code configured to: extract terms from a content item using statistical selection criteria; weight a term by a probability that the term is used as a tag; and generate a visual representation of terms with enhanced representation of terms according to the weighting.

According to a fourth aspect of the present invention there is provided a method of providing a service to a customer over a network for automatic generation of a word-cloud, the service comprising: extracting terms from a content item using statistical selection criteria; weighting a term by a probability that the term is used as a tag; and generating a visual representation of terms with enhanced representation of terms according to the weighting.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

A method, system and computer program product are described for improved word-cloud generation. The described approach, termed "tag-boost", promotes terms in a content item's description that are frequently used to tag items by the public. Internal terms are selected from the item description by term selection methods, according to statistical selection criteria, and additionally according to their relative frequency in a tag-based folksonomy. Thus, terms that people frequently use to tag content are boosted compared to terms that are not frequently used as tags.

A term may be a keyword, a key-phrase, part of a word, an abbreviation, a number, a combination of numerical and alphabetical characters, etc. A content item may be a web page, a web site, a document, or any other form of content item.

Terms that are used to tag resources, even in other domains, are believed to serve as better tags than (statistically) significant terms that have never been used to tag content by the public.

At first, terms are extracted from the item's description using any term extraction technique. Then, the weight of each extracted term is boosted by a tag-boost score that reflects the probability of that term being used as a tag. This probability is estimated from the folksonomy of tags (the taxonomy of all tags assigned to items in the collection). Then, terms with higher boosted scores are selected for the word-cloud representation.

For a cluster of items, the method may extract for each item in the cluster a list of terms using the tag-boost approach. Then, these extracted terms may be integrated into a word-cloud by any existing aggregation method.

The folksonomy used for tag-boosting may be imported from any external domain and is not limited to the domain-based folksonomy of the current content item, which might be poor or noisy. Thus, this method can be applied to any content, including non-tagged or sparsely tagged domains. However, the efficiency of the tag-boost approach depends on the quality of the folksonomy used for tag-boosting and its suitability for the content to be represented.

The tag-boost approach for term extraction is motivated by traditional named entity recognition techniques that boost important terms according to their linguistic features (e.g., the term's part-of-speech category). In this case, terms that are frequently used to tag resources, even in other domains, are believed to serve as better tags than statistically significant terms that have never been used to tag content by the public.

Figure 1:
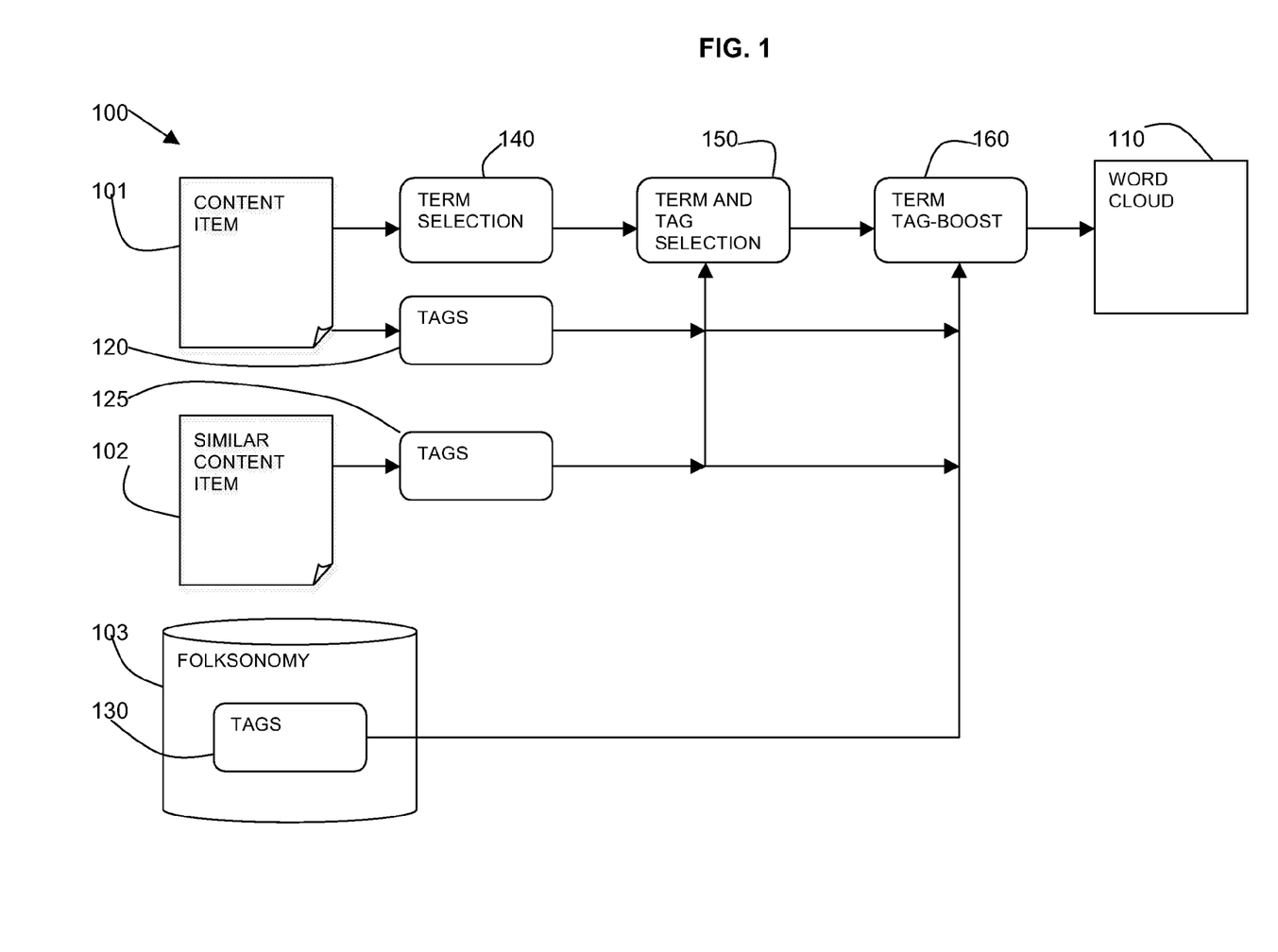
FIG. 1 is a schematic diagram illustrating automatic word-cloud generation in accordance with the present invention.

Referring to FIG. 1, a schematic diagram 100 shows a content item 101 for which a word-cloud 110 is required in the form of a visual representation of descriptive terms of the content item 101.

The content item 101 may have tags 120 associated with it generated by the content creator or content viewers. However, the content item 101 may have sparse tags or no tags at all.

A similar content item 102 determined by collaborative filtering may have tags 125 associated with it which may be considered as relevant to the content item 101.

A tag-folksonomy 103 of tags 130 may be provided for a domain. The domain may include the content item 101 as well as other content items or may be an external domain not including the content item 101.

A term selection process 140 statistically extracts terms from the content item 101 for the word-cloud 110. A term and tag selection 150 may combine statistically extracted terms with tags 120, 125 from the content item 101 or from one or more similar content items 102.

A term tag-boost process 160 promotes terms based on their use as tags 120, 125, 130 from one or more of the content item 101, one or more similar content items 102, or from a folksonomy 103.

Figure 2A:
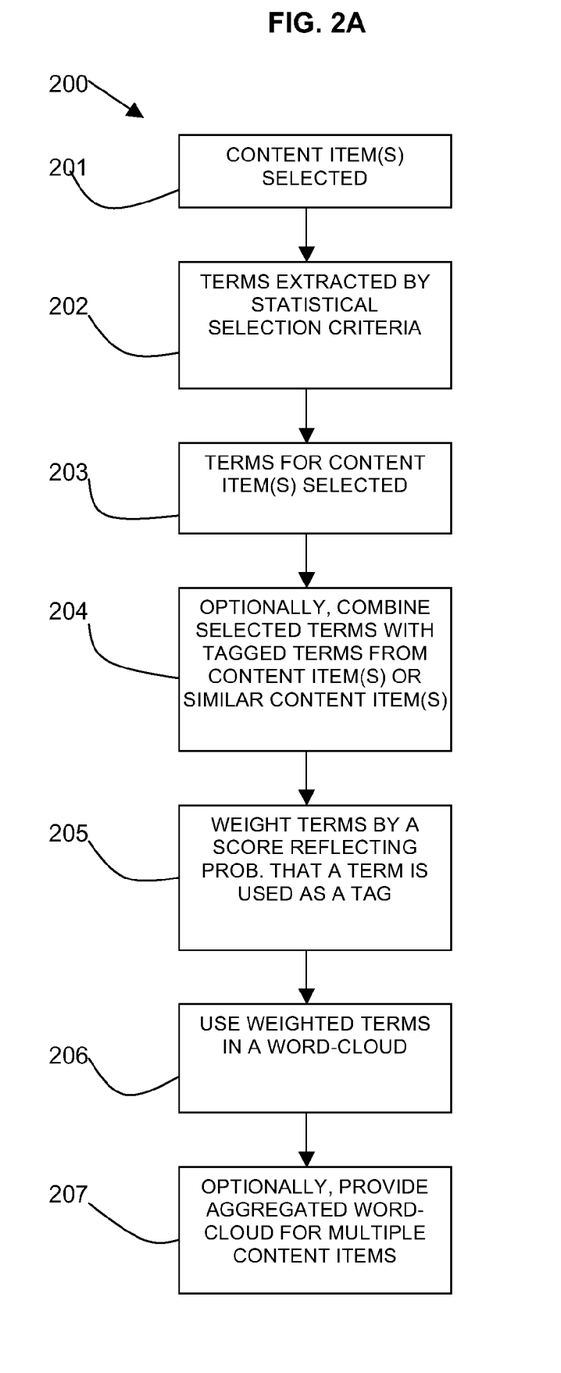
FIGS. 2A and 2B are flow diagram of aspects of a method of automatic word-cloud generation in accordance with the present invention.

Referring to FIG. 2A, a flow diagram 200 shows an embodiment of a method of automatic word-cloud generation.

One or more content items may be selected 201 and terms are extracted 202 from the content item(s) by statistical selection criteria. Terms for the content item(s) are selected 203. Optionally, extracted terms may be combined 204 with tagged terms for the content item(s), or with tags that are selected from similar items by collaborative filtering techniques.

The terms may be weighted 205 by a score reflecting the probability that a term is used as a tag. The weighted terms may then be used 206 in a word-cloud visual representation.

Optionally, multiple content items may have an aggregated word-cloud provided 207 by integrating the weighted terms from the multiple content items.

Figure 2B:
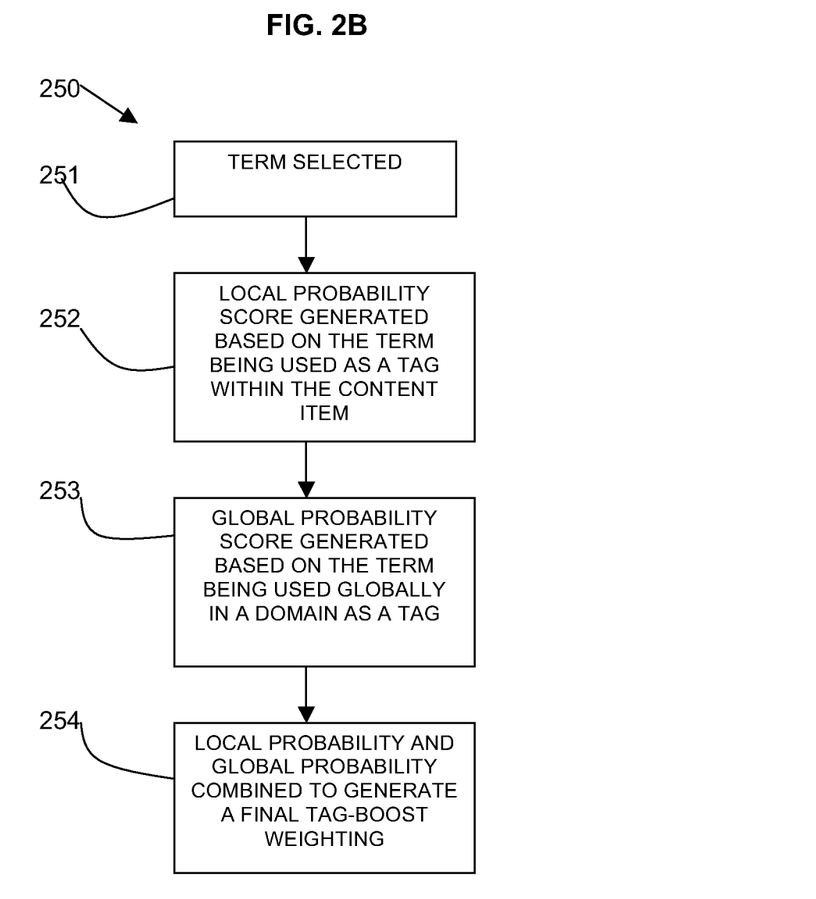

Referring to FIG. 2B, a flow diagram 250 shows an example embodiment of a method of weighting terms by a score reflecting the probability that a term is used as a tag.

A term may be selected 251. A local probability score may be generated 252 based on the term being used as a tag within a content item. A global probability score may be generated 253 based on the term being used globally in a domain as a tag. The local probability and the global probability estimations may be combined 254, for example by smoothing, to generate a final tag-boost weighting.

In one example embodiment, the tag-boost weighting score may be computed as follows.

Let C be a set of items and let w be a term, $C_w$ the set of items containing w, and $T_w$ the set of items tagged by w.

1. The local probability of w being used as a tag may be:

$$Pr_{local}(w \mid C) \stackrel{def}{=} \frac{|C_w \cap T_w|}{|C_w|}$$

This is the maximum likelihood estimation to the probability that a given term within the item's content will be used to tag that item.

2. The global probability of w being used as a tag may be:

$$Pr_{global}(w \mid C) \stackrel{def}{=} \frac{|T_w|}{|C|}$$

This is the maximum likelihood estimation that a given term will be used as a tag.

3. The final tag-boost weighting may be set by smoothing these two estimations:

$$Pr_{boost}(w \mid C)^{def} = \lambda \cdot Pr_{local}(w \mid C) + (1-\lambda) \cdot Pr_{global}(w \mid C)$$

$\lambda$ can be tuned specifically to each domain, or can be set a priori. In an example embodiment, $\lambda$ may be set to 0.9 which performs well over several domains.

4. Then each term may be boosted according to the tag-boost probability.

Figure 3:
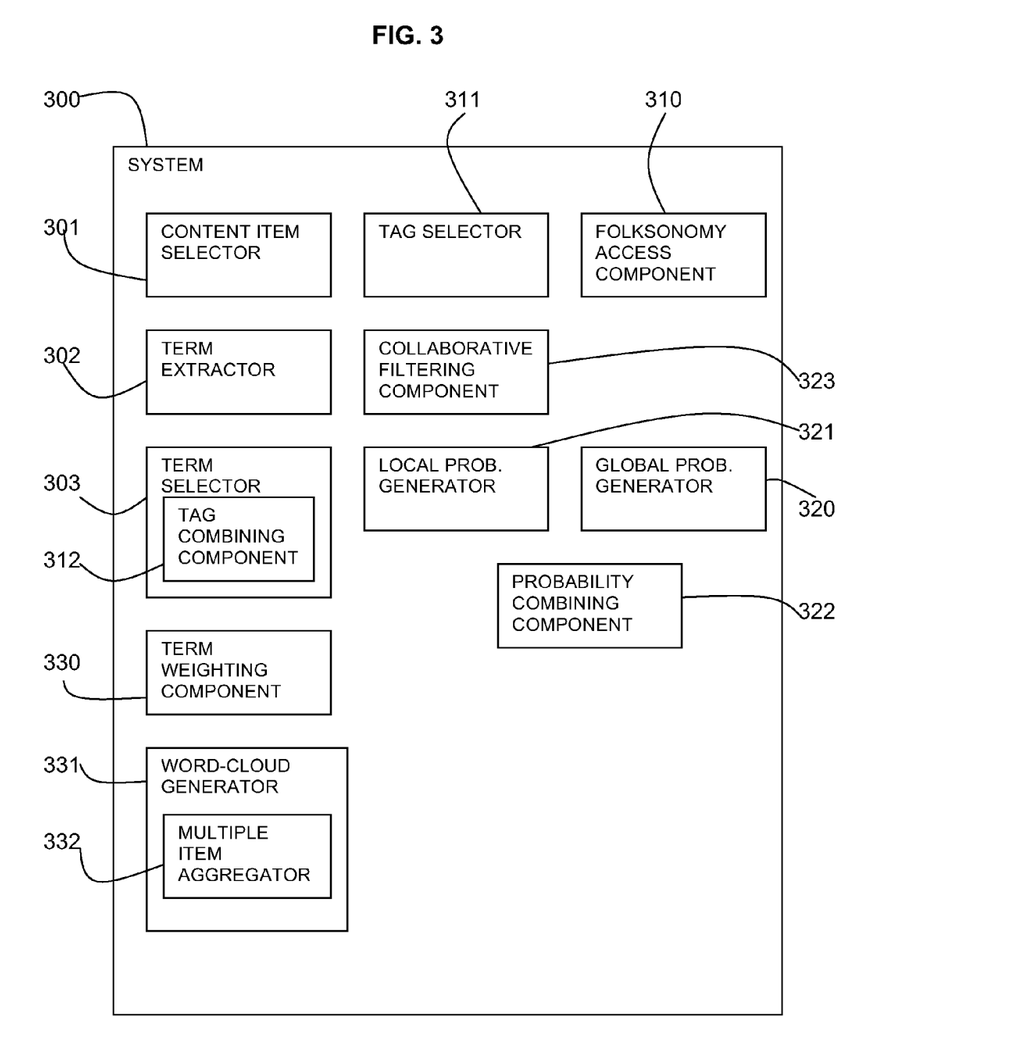
FIG. 3 is a block diagram of a system in accordance with the present invention.

Referring to FIG. 3, an example embodiment of a system 300 is shown for automatic word-cloud generation. The system 300 may include a content item selector 301 for selecting one or more content items for which a word-cloud is to be generated. The one or more content items may be a cluster or group of related content items. A term extractor 302 may extract terms from the selected content item using a statistical selection technique. A term selector 303 may then select the top extracted terms.

A folksonomy access component 310 may be provided which accesses a tag-folksonomy for the domain of the selected content item or items or an external domain to provide a source of tags. A tag selector 311 may be provided for selecting tags associated with the content item or items.

The tags from a tag selector 311 for the content item or items may be added to the selected terms of the term selector 303 by a tag combining component 312.

A collaborative filtering component 323 may be provided for determining one or more similar content items to the selected content item and the tag combining component 312 of the term selector 303 may add tags from the similar content items to the selected terms of the term selector 303.

A global probability generator 320 may be provided to generate a global probability of a term selected by the term selector 303 being used as a tag in the folksonomy.

A local probability generator 321 may be provided to generate a local probability of a term selected by the term selector 303 being used as a tag in the selected content item.

A probability combining component 322 may be provided for combining and smoothing the global and local probabilities of a term being used as a tag.

A term weighting component 330 may be provided to boost the terms selected by the term selector 303 according to the probability of a term being used as a tag. A word-cloud generator 331 may be provided for generating a word-cloud for the selected content item including the boosted, extracted terms. The word-cloud generator 331 may include a multiple item aggregator 332 for combining multiple content items to provide a single word-cloud.

Figure 4:
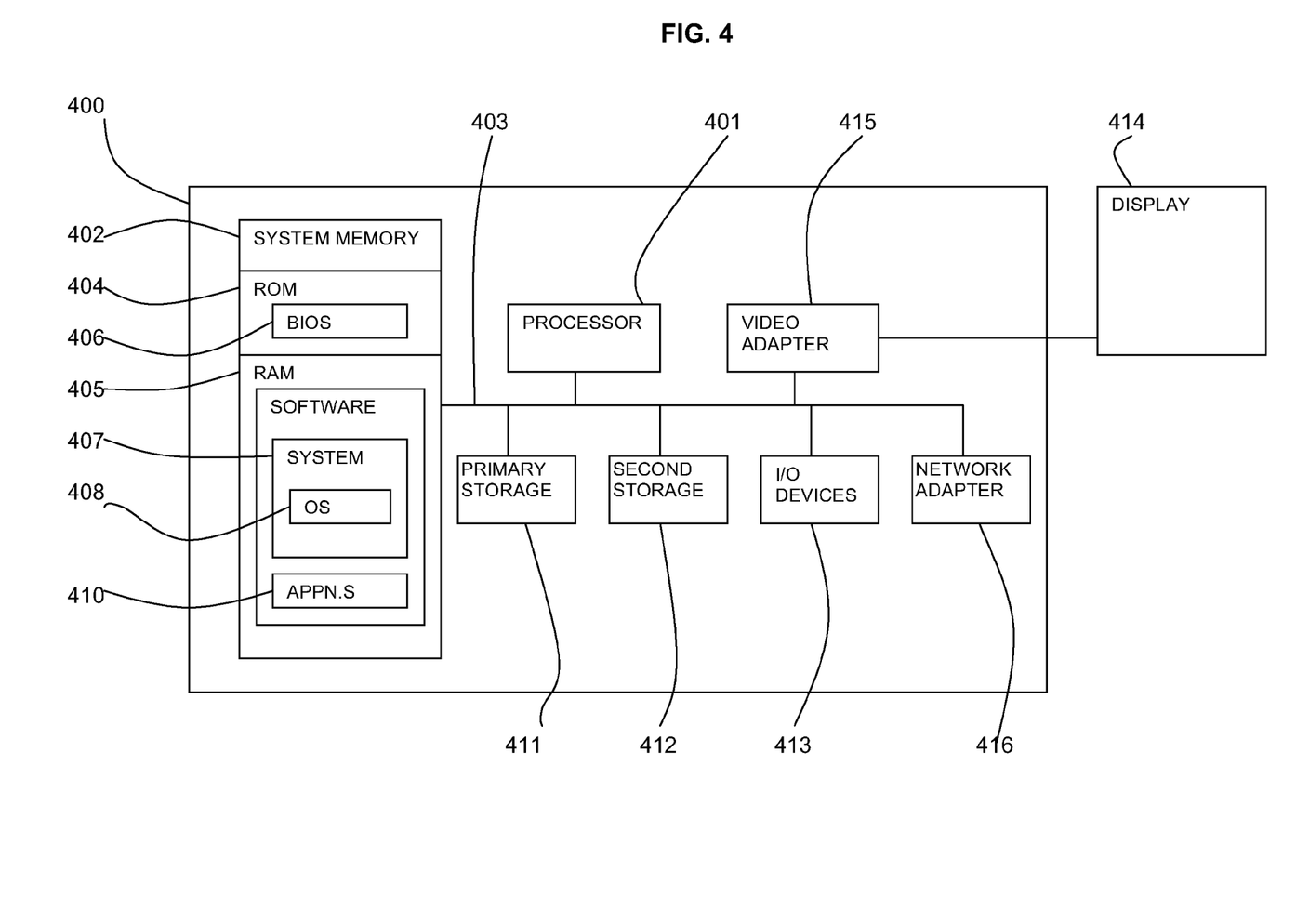
FIG. 4 is a block diagram of a computer system in which the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Tag-cloud Generation

Tag-cloud generation techniques that focus on existing manual tags are relatively simple, as their task is restricted to ranking the tags associated with the item to represent. In many cases, tags are ranked according to the number of times they were used to tag the item. In this section, an example tag-cloud generation technique is described which has been proved to perform properly in well-tagged domains.

Let e be an item tagged by k manual tags, $(t_1, \ldots, t_k)$, then a tag-cloud (a ranked list of representative tags) can be generated by ranking the tags according to the tag score, s(t,e), defined by the following weighting formula:

$$s(t,e) = tf(t,e) \cdot ief(t);$$

tf(t,e)=log(freq(t,e)+1) is proportional to freq(t,e), the number of times e was tagged by t, and ief(t)=log $N/N_t$ is the inverse entity frequency of the tag t, where N is the total number of items, and $N_t$ is the number of items tagged by t. Note that such a weighting scheme is analogous to the popular vector-space tf-idf weighing approach. Thus, a highly used tag (high tf), that is assigned to only a few items in the collection (high ief), is ranked higher in the cloud.

A tag-cloud for a cluster of tagged items is generated by ranking the tags assigned to all items in the cluster. Let S= $\{e_1 \ldots, e_n\}$ be a list of tagged items, ranked according to an arbitrary score function, Score(e). Each item $e_i$ is associated with a list of tags), $(t_1^i, \ldots, t_{k_i}^i)$, $k_i \geq 0$ (for a non-tagged item $e_j$, $k_j=0$). The aggregated score of a tag, with respect to S, is determined as follows:

$$s(t, S) = \sum_{e \in S} \text{Score}(e) \cdot s(t, e). \quad (1)$$

Thus, tags that are frequently assigned to many highly scored items are ranked higher in the tag-cloud.

Term Extraction

In sparsely tagged domains there may not be enough manual tags to use for tag-cloud representation. Important terms can be extracted from the item's related content to be used as automatic tags. It is assumed that each item is associated with a textual description, from which significant terms can be extracted for word-cloud representation. Term extraction is strongly related to feature selection, which is the process of selecting a subset of the terms for text representation, and is frequently applied by text categorization and text clustering methods. Common approaches for feature selection evaluate terms according to their ability to distinguish the given text from the whole text. In this case, the aim is to find a set of terms that best distinguishes the item, or the cluster of items, from the entire collection.

In this work, four example extraction techniques are described:
1) tf-idf, which selects terms from the item textual description with maximum tf-idf weights;
2) Mutual information (MI), which measures how much information the presence/absence of a term contributes to the item description;
3) $\chi^2$ which measures the statistical independence of the occurrence of the term in the item description and its occurrence in the collection; and
4) Kullback-Leibler divergence (KL) which looks for a set of terms that maximize the KL divergence between the language model of the item's content and the language model of the entire collection.

If an item is only annotated with a few tags, which are not sufficient for tag-cloud representation, then the tag-cloud can be supplemented with extracted terms. The tags and terms combination policy applied in this work is based on placing the manual tags at the top of the ranked list, and then completing the list with the top scored extracted terms. This policy follows the assumption of the superiority of manual tags over automatic extracted terms.

More sophisticated combination policies between tags and terms can be considered; for example, measuring the mutual relationships between tags and terms. However, existing methods assume the existence of sufficient associated tags.

Tag-boost Enhancement

Automatic extracted terms are very useful for information retrieval applications such as text clustering and categorization. However, in general, significant terms are not always optimal for labeling given content. It seems that an important term, as determined by common statistical criteria, is not always considered as a good label by human annotators. Therefore, this work hypothesizes that terms considered as good labels by humans have specific characteristics that are not always exposed by standard statistical extraction approaches. The likelihood of a term to be considered by humans as a good tag (label) is attempted to be measured.

Let C be a collection of items, and let w be a term. Let $C_w \subseteq C$, and $T_w \subseteq C$ be the set of items containing w, and the set of items tagged by w, respectively. The probability of term w to tag an item when appearing in its description may be approximated by maximum likelihood estimation (MLE):

$$Pr_{local}(w \mid C) \stackrel{def}{=} \frac{|C_w \cap T_w|}{|C_w|}$$

$Pr_{local}(w|C)$ estimates the probability that a term w found in the item's description, will also be used to tag that item. Thus, terms with high values should be biased by term extraction methods for word-cloud generation.

The second measure applied, which is related to the ief measure discussed above, approximates the global likelihood of a term to be used as a tag. The approximation is based on the assumption that a term w, used to tag many items in the collection, is more likely to be used as a tag for any item in the collection, compared to terms which are rarely used as tags.

$$Pr_{global}(w \mid C) \stackrel{def}{=} \frac{|T_w|}{|C|}$$

When estimating probabilities based on a limited amount of data, smoothing may be used to adjust the maximum likelihood estimator so as to correct the inaccuracy due to data sparseness. For example, a term that has not been used to tag the item it belongs to ($Pr_{local}=0$), should still be considered a good candidate for tagging when it is frequently used to tag other items in the collection (with high $Pr_{global}$).

Therefore, the tag-boost probability applied in this work is based on the Jelinek-Mercer smoothing of the two estimators:

$$Pr_{boost}(w|C)^{def} = \lambda \cdot Pr_{local}(w|C) + (1-\lambda) \cdot Pr_{global}(w|C) \quad (2)$$

The smoothing coefficient $\lambda$, can be optimally tuned for each individual collection. For example, $\lambda$ may be set at 0.9.

Finally, each term extracted from the item's description, by any statistical term extraction technique, may be boosted by multiplying its (statistical) weight by the estimated tag-boost probability, and terms with the maximum boosted score are selected for word-cloud representation:

$$S_{boost}(w,e) = s(w,e) \cdot Pr_{boost}(w|C) \quad (3)$$

Note that when both estimators of term w are zero, i.e., w is never used to tag an item, then its boosted score is zeroed and it is not selected by the tag-boost approach, no matter what its statistical score. It is also noted that both estimators of the term tagging characteristics can be inferred from any collection of tagged items. Thus, it is possible to estimate those probabilities from a well-tagged collection and use them to boost terms in sparsely tagged collections that suffer from insufficient statistics.

Collaborative Filtering

Collaborative filtering (CF) is a popular technique for recommending items that are related to "similar" users. For example, an on-line book store can recommend to its users books bought by others who have a similar buying pattern.

In this case, item-based CF can be used for tag-cloud generation to enrich an item's tag-cloud with tags used for annotating similar items. The principal idea is that a manual tag for an item is also expected to be suitable for a similar item. The main advantage of CF methods over term extraction-based methods is that external (manual) tags that do not occur in the item description may be superior to automatic terms that were not given manually. On the contrary, a CF-based approach is sensitive to the way similarity is measured between items, and appropriate tags for a given item do not always fit its similar items. Moreover, CF assumes the existences of good tags for similar items—an assumption that does not hold in sparsely tagged domains.

Nevertheless, CF methods are very popular recommendation techniques, therefore they may be applied for tag-cloud generation as a strong baseline approach. Given an item e, a set of similar items is first found, $S(e)=(e_1, \ldots e_n)$, scored according to their similarity to e, and then create a tag-cloud for this set using Equation (1). The similarity between items may be measured using the Lucene open source search engine (www.lucene.apache.org, Lucene is a trade mark of Apache Software Foundation), i.e., each item's description is indexed as a document by Lucene, and the most similar items may be retrieved for a query that is based on the most significant terms extracted from the item's description. Various methods for term extraction for similarity measurement may be used including the term extractions methods described above used for word-cloud generation.

The CF method can also be integrated with term extraction methods. If no tags are assigned to a similar item, or only a few are assigned, then the tag-cloud of that item can be supplemented with internal terms extracted from the item description. Subsequently, the CF based tag-cloud of both tags and terms can be aggregated from all items.

An automatic word-cloud generating system may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for automatic generation of a word-cloud for a content item, comprising:
    extracting terms from a content item, belonging to a specific domain including a plurality of content items, using statistical selection criteria;
    providing a folksonomy of terms previously used by users to tag content items, including items belonging to an external domain and not belonging to the specific domain;
    weighting a plurality of the extracted terms by a tag probability, determined from the provided folksonomy, that the term is used as a tag; and
    generating a visual representation of the extracted terms in which each of the extracted terms is displayed with a representation weight calculated from a statistical weight of the extracted term, boosted by the weighting tag probability of the extracted term;
    wherein said steps are implemented in either:
    computer hardware configured to perform said steps, or
    computer software embodied in a non-transitory, tangible, computer-readable storage medium,
    wherein providing the folksonomy comprises providing a folksonomy of tags suggested by people and wherein weighting the plurality of extracted terms comprises weighting by a probability, determined from the provided folksonomy, that the term is used as a tag by people.

2. The method as claimed in claim 1, wherein weighting one or more of the extracted terms includes determining the relative frequency of the term in the provided folksonomy.

3. The method as claimed in claim 1, including:
    combining terms tagged in the content item with the extracted terms, and weighting the combined terms.

4. The method as claimed in claim 1, including:
    combining terms tagged in a similar content item with the extracted terms, and weighting the combined terms.

5. The method as claimed in claim 1, including:
    selecting the higher weighted terms for representation in the generated visual representation of terms.

6. The method as claimed in claim 1, including:
    extracting terms from multiple content items; and
    generating a visual representation of aggregated terms for the content items.

7. The method as claimed in claim 1, wherein providing the folksonomy comprises providing a folksonomy representing a general use of terms as tags by the public.

8. The method as claimed in claim 1, wherein providing the folksonomy comprises providing a folksonomy determined from a domain not including the content item from which the terms are extracted.

9. A method for automatic generation of a word-cloud for a content item, comprising:
    extracting terms from a content item, belonging to a specific domain including a plurality of content items, using statistical selection criteria;
    providing a folksonomy of terms previously used by users to tag content items, including items belonging to an external domain and not belonging to the specific domain;
    weighting a plurality of the extracted terms by a tag probability, determined from the provided folksonomy, that the term is used as a tag; and
    generating a visual representation of the extracted terms in which each of the extracted terms is displayed with a representation weight calculated from a statistical weight of the extracted term, boosted by the weighting tag probability of the extracted term;
    wherein said steps are implemented in either:
    computer hardware configured to perform said steps, or
    computer software embodied in a non-transitory, tangible, computer-readable storage medium, and wherein weighting one or more of the extracted terms includes:
        generating a local probability score based on a term being used as a tag within the content item;
        generating a global probability score based on a term being used as a tag within a domain; and
        combining the local and global probability scores to generate a weighting for a term.

10. A system for automatic generation of a word-cloud for a content item, comprising:
    a processor;
    a term extractor for extracting terms from a content item using statistical selection criteria;
    a term weighting component for weighting a term by a probability that the term is used as a tag, based on a folksonomy of terms previously used by users to tag content items, including items not belonging to a specific domain including a plurality of content items, to which the content item from which the term was extracted belongs, but rather belonging to an external domain; and
    a word-cloud generator for generating a visual representation of terms extracted by the term extractor from a specific content item, in which each of the extracted terms is displayed with a representation weight calculated from a statistical weight of the extracted term, boosted by a weighting tag probability of the extracted term, calculated by the term weighting component,
    wherein the term extractor is configured to extract the terms automatically without human user aid.

11. The system as claimed in claim 10, wherein the term weighting component is for determining the relative frequency of the term in the folksonomy of tag terms for a domain.

12. The system as claimed in claim 10, including:
    a term selector for selecting extracted terms.

13. The system as claimed in claim 12, wherein the term selector includes a tag combining component for combining terms tagged in the content item with the extracted terms, and the term weighting component weighting the combined terms.

14. The system as claimed in claim 12, wherein the term selector includes a tag combining component for combining terms tagged in a similar content item with the extracted terms, and the term weighting component weighting the combined terms.

15. The system as claimed in claim 10, wherein the word-cloud generator includes a multiple item aggregator for generating a visual representation of aggregated terms for a cluster of content items.

16. A system for automatic generation of a word-cloud for a content item, comprising:
  a processor;
  a term extractor for extracting terms from a content item using statistical selection criteria;
  a term weighting component for weighting a term by a probability that the term is used as a tag, based on a folksonomy of terms previously used by users to tag content items, including items not belonging to a specific domain including a plurality of content items, to which the content item from which the term was extracted belongs, but rather belonging to an external domain; and
  a word-cloud generator for generating a visual representation of terms extracted by the term extractor from a specific content item, in which each of the extracted terms is displayed with a representation weight calculated from a statistical weight of the extracted term, boosted by a weighting tag probability of the extracted term, calculated by the term weighting component, and wherein the term weighting component includes:
    a local probability generator for generating a score based on a term being used as a tag within the content item;
    a global probability generator for generating a score based on a term being used as a tag within a domain; and
    a probability combining component for smoothing the local and global probability scores to generate a weighting for a term.

17. A computer program product for automatic generation of a word-cloud for a content item, the computer program product comprising:
  a non-transitory computer readable storage medium having computer readable program code embodied therewith, the computer readable program code comprising:
  computer readable program code configured to:
    extract terms from a content item belonging to a specific domain including a plurality of content items, automatically using statistical selection criteria, without human user aid;
    weight one or more of the extracted terms by a tag probability that the term is used as a tag, determined based on a folksonomy of terms previously used by users to tag content items, including items belonging to an external domain and not belonging to the specific domain; and
    generate a visual representation of the extracted terms in which each of the extracted terms is displayed with a representation weight calculated from a statistical weight of the extracted term, boosted by the weighting tag probability of the extracted term.

18. A method of providing a service to a customer over a network for automatic generation of a word-cloud, the service comprising:
  extracting, by a processor, terms from a content item belonging to a specific domain including a plurality of content items, using statistical selection criteria;
  weighting one or more of the extracted terms by a probability that the term is used as a tag, determined based on a folksonomy of terms previously used by users to tag content items, including items belonging to an external domain and not belonging to the specific domain; and
  generating a visual representation of the extracted terms in which each of the extracted terms is displayed with a representation weight calculated from a statistical weight of the extracted term, boosted by the weighting tag probability of the extracted term,
  wherein the folksonomy comprises a folksonomy of tags suggested by people and wherein weighting the one or more of the extracted terms comprises weighting by a probability, determined from the provided folksonomy, that the term is used as a tag by people.

19. A method for automatic generation of a word-cloud for a content item, comprising:
  extracting terms from a content item, belonging to a specific domain including a plurality of content items, using statistical selection criteria;
  providing a folksonomy of terms previously used by users to tag content items, including items belonging to an external domain and not belonging to the specific domain;
  weighting a plurality of the extracted terms by a tag probability, determined from the provided folksonomy, that the term is used as a tag; and
  generating a visual representation of the extracted terms in which each of the extracted terms is displayed with a representation weight calculated from a statistical weight of the extracted term, boosted by the weighting tag probability of the extracted term;
  wherein said steps are implemented in either:
  computer hardware configured to perform said steps, or
  computer software embodied in a non-transitory, tangible, computer-readable storage medium,
  wherein extracting terms from a content item comprises extracting the terms automatically by a processor without human user aid.

20. The method as claimed in claim 19, wherein providing the folksonomy comprises providing a folksonomy representing a general use of terms as tags by the public.

21. The method as claimed in claim 19, wherein providing the folksonomy comprises providing a folksonomy determined from a domain not including the content item from which the terms are extracted.

* * * * *